US006591103B1

(12) United States Patent
Dunn et al.

(10) Patent No.: US 6,591,103 B1
(45) Date of Patent: Jul. 8, 2003

(54) WIRELESS TELECOMMUNICATIONS SYSTEM AND METHOD OF OPERATION PROVIDING USERS' CARRIER SELECTION IN OVERLAPPING HETEROGENOUS NETWORKS

(75) Inventors: James M. Dunn, Ocean Ridge, FL (US); Bruce P. Semple, Potomac, MD (US); Edith H. Stern, Boca Raton, FL (US); Barry E. Willner, Briar Cliff Manor, NY (US)

(73) Assignee: International Business Machine Corp., Armonk, NY (US)

( * ) Notice: Subject to any disclaimer, the term of this patent is extended or adjusted under 35 U.S.C. 154(b) by 0 days.

(21) Appl. No.: 09/343,234

(22) Filed: Jun. 30, 1999

(51) Int. Cl.[7] .................................................. H04Q 7/20
(52) U.S. Cl. ....................................... 455/436; 455/439
(58) Field of Search ................................ 455/439, 432, 455/433, 456, 435, 512, 552, 553, 405, 524, 525, 554, 555, 443

(56) References Cited

U.S. PATENT DOCUMENTS

| | | | |
|---|---|---|---|
| 4,864,494 A | | 9/1989 | Kobus, Jr. |
| 5,301,359 A | * | 4/1994 | Van den Heuvel et al. . 455/435 |
| 5,519,778 A | | 5/1996 | Leighton et al. |
| 5,625,877 A | | 4/1997 | Dunn et al. |
| RE35,916 E | | 10/1998 | Dennison et al. |
| 5,818,814 A | | 10/1998 | Testani et al. |
| 5,878,344 A | | 3/1999 | Zicker |
| 5,901,352 A | * | 5/1999 | St-Pierre et al. ............ 455/426 |
| 6,148,197 A | * | 11/2000 | Bridges et al. .............. 455/432 |
| 6,177,905 B1 | * | 1/2001 | Welch ........................ 455/436 |
| 6,317,594 B1 | * | 11/2001 | Gossman et al. ........... 455/414 |

* cited by examiner

Primary Examiner—Nguyen T. Vo
Assistant Examiner—Tu X Nguyen
(74) Attorney, Agent, or Firm—Morgan & Finnegan, LLP; Joseph C. Redmond, Jr.

(57) ABSTRACT

An improved wireless telecommunication system enables a user to obtain communication services in overlapping wireless heterogeneous or homogeneous cellular networks at the most economical cost and bandwidth. A plurality of overlapping cellular networks includes a common command channel, a Central Selection Agency (CSA), a home location register, a visitor location register, and a user device positional location mechanism. In one embodiment the user device is equipped with a Global Positioning System (GPS) to determine its location. In placing a call, the user device broadcasts its ID, location and connection capability requirements on the common command channel. When a base station for the command channel bears the request, the CSA and the home location register for the user are informed. The CSA capability/requirements determine which network and base station selections are potential carriers for the call. Based on user preferences established by a profile stored in an accessible database, the CSA assigns a network and base station to handle the connection. The user device is informed and tunes to the appropriate network and protocols. For incoming calls, the calling party checks the home location register to determine the last known location. The user device is informed that a called is waiting. The user device selects the network and base station to receive the call in a fashion similar to that of placing the call. A call may be transferred from one network to a different network, the networks using different protocol. The user device may be programmed to change networks at random times to provide enhanced security for a call.

22 Claims, 12 Drawing Sheets

NETWORKS, BASE STATIONS IN A LOCATION, WITH COMMON COMMAND CHANNEL

NETWORKS, BASE STATIONS
IN A LOCATION

NETWORKS, BASE STATIONS IN A
LOCATION, WITH COMMON COMMAND CHANNEL

INITAITING A CALL,
CENTRAL SELECTION AGENCY
COMMON COMMAND CHANNEL

INITIATING A CALL,
NO CENTRAL SELECTION AGENCY
SHARED COMMAND CHANNEL

INITIATING A CALL,
PBX/EDGE NODE

WIRELESS TELECOMMUNICATIONS SYSTEM AND METHOD OF OPERATION PROVIDING USERS' CARRIER SELECTION IN OVERLAPPING HETERGENOUS NETWORKS

RELATED APPLICATIONS

1. Ser. No. 08/195,905, filed Mar. 17,1997, entitled COMMUNICATION NETWORK AND METHOD OF OPERATION FOR REAL TIME USER SELECTION OF VOICE AND/OR DATA PATHS IN THE NETWORK (BC996-060/1963-7114), assigned to the same assignee as that of the present invention and fully incorporated herein by reference.

2. Ser. No. 09/256,569, filed Feb. 24, 1999, that issued Dec. 19, 2000 as U.S. Pat. No. 6,163,683, entitled "Broadcast Data Radio System and Receiver Apparatus Therefor" (BC9-98-068), assigned to the same assignee as that of the present invention and fully incorporated herein by reference.

BACKGROUND OF THE INVENTION

1. Field of the Invention

This invention relates to wireless telecommunications systems and methods of operation. More particularly, the invention relates to carrier selection in overlapping heterogeneous wireless telecommunication networks or base stations in homogenous networks.

2. Description of Prior Art

Today user's can take advantage of multiple communication networks, particularly mobile voice communications heavily built out and overlapping in coverage. Such networks provide Advanced Mobile Phone Service (AMPS) using analog technology or digital technology using Time Division Multiple Access (TDMA), Code Division Multiple Access (CDMA), Global Standard Mobile (GSM), etc.

The cell structure employed by such communication networks is designed to provide good communication capability within its coverage area. When communication networks compete, as is the case today with AMP, CDMA and TDMA options, the cell structure and coverage area overlaps. A user in a metropolitan area is likely to be within the coverage area of three or more communication networks. At any given location and time, dependent on load, position, building interference, any of these networks might provide the best service for a given user. With a protocol agile terminal, a user can obtain the desired communication at the best price. Additionally, since there is no universal coverage by any given network provider, the user may piece together "universal coverage" by taking advantage of all network build-outs rather than picking just one. As new protocols are invented, with less than universal applicability, (i.e., a protocol designed for skyscraper interference in a city), the user can take advantage of such protocols for which they are designed without losing the more general network connectivity. Moreover, network providers now have a way to balance load in their cell. If a cell is relatively idle, a provider can drop the price to entice more traffic. If high bandwidth for data communication is required or more profitable, a provider can an offer a higher bandwidth to the requesting device. Further, if a provider has heterogeneous subnetworks, a provider may offer service more seamlessly.

Prior art related to selective service management in wireless telecommunication networks, includes the following:

U.S. Pat. No. 5,625,877 issued Apr. 29, 1997, discloses a wireless air-link communication system which allows a user of an end-user communicating device, e.g., a cellular phone, computer, facsimile, to request the allocation of an aggregation of available air-link communication channels for wireless variable bandwidth across the air links at the demand of the user. Variable bandwidth for wireless communication increases the speed and efficiency of data transmission conventionally limited to fixed speeds because such transmissions have been across a single air link channel.

U.S. Pat. No. RE35, 916 issued Oct. 6, 1998, discloses a cellular telephone system that uses position of a mobile unit to make call management decisions. Call management includes selection of a cell site most appropriate for a call associated with a mobile unit. Selection is based on the geographic location of the mobile unit as opposed to the strength of the signal associated with the cell. The geographic location of the mobile unit is precisely determined using a satellite, e.g. Global Positioning System or its equivalent. Each mobile unit includes a GPS receiver that receives information from a geo-stationary satellite to determine the precise location of the mobile unit. The position information is relayed to the cell site initially managing the mobile unit. The mobile unit is handed off to a cell site that is most appropriate for the call. Initial selection of an entrance cell site is made based on signal strength, but further call management decisions are based on location of the mobile unit.

U.S. Pat. No. 5,818,814 issued Oct. 6, 1998 discloses a method and apparatus for synchronizing and controlling remote receivers. A mobile receiver is synchronized to one of a plurality of transmitters, each transmitter disposed in a separate zone and having a defined range. A common command channel is provided for both zones of which command information can be transmitted from the transmitters. Each of the transmitters is operable to transmit over the common command channel a carrier having a pulse stream at a frequency that is a harmonic of a predetermined, fundamental frequency. The pulse streams are synchronized with each other with at least two transmitters having different frequencies. Each of the pulses in each of the pulse streams is pulsed width modulated with command information associated with the associated transmitter. These various commands define the channel over which audio is to be transmitted. The channels can either be user-defined or they can be the function of the transmitter.

U.S. Pat. No. 5,878,344 issued Mar. 2, 1999, filed Feb. 24, 1994, discloses a system which automatically switches a user handset between a standard cellular radiotelephone mode of operation and enhanced cordless mode when the handsets are within range of pico cells that are interconnected to the public switch telephone network. Each pico cell is controlled via a framework of overlay cells that operate independently of the radio telephone network and use a unique control protocol on a small number of reserved cellular channels. Each pico cell consists of a spectrally dynamic, non-capturing, frequency agile, multiple purpose base station provided at customer selected locations to cooperate fully with the overlay cell framework. Each pico cell reduces traffic on the standard cellular radiotelephone network by independently handling registered handsets. An alternate line option module provides wireless local interconnect capability to selectively route call traffic between landlines and radiotelephone network. Service control units and host stations facilitate wireless activation in control of each pico cell and handset via the overlay.

None of the prior art disclose carrier selection in overlapping heterogeneous mobile wireless communication networks, particularly, where hand over of calls between heterogeneous network may be carried over a different set of frequencies with different protocols that require the mobile station to monitor the adjacent cells for hand off preparation.

SUMMARY OF THE INVENTION

An object of the invention is a wireless telecommunication system and method of operation providing users carrier selection in overlapping heterogeneous networks Another object is enabling users to select a preferred carrier in overlapping heterogeneous network.

Another object is an internetwork command channel linked to users for carrier selection purposes.

Another object is a Central Selection Agency (CSA) determining carrier selection for a given user depending upon user requirements and network availability.

Another object is a shared command channel linking heterogeneous networks available to users for carrier selection.

Another object is enabling edge nodes in heterogeneous networks to mediate carrier selection for a user.

Another object is enhanced security for wireless calls on the originator's end of the call.

These and other objects, features and advantages are achieved in a wireless telecommunication network selection system and method of operation which enables a user to obtain communication services in heterogeneous or homogeneous wireless networks using different protocols and frequencies at the most economical cost and bandwidth. A plurality of overlapping networks includes an internetwork command channel, a Central Selection Agency (CSA), a home location register, a visitor location register, and a user device positional location mechanism. The system and method may exist in several embodiments. In one embodiment, user devices equipped with Global Positioning System (GPS) determine a location. within fine limits. In placing a call a user device broadcasts an ID, location and connection capability requirements on a common command channel. When a base station for the command channel hears a request, the CSA and the home location register for the user are informed. The CSA using the location information and the connection capability/requirements determines which network and base stations are potential carriers. Based on user preferences (established by profile), the CSA assigns a network and base station to handle connection. The user device is informed and tunes to the appropriate network and protocol. For incoming calls, the calling party checks the home location register to determine the last known location. The called user device is informed by the command channel that a call is waiting. The called user device selects a network and base station to receive the call in a fashion similar to that of placing the call. A hand over of a user call between heterogeneous networks may be carried over a different set of frequencies with different protocols requiring the CSA to monitor the adjacent cells for handoff preparation. The user call is transferred to the heterogeneous network by the CSA according to the user profile and the preparation by the heterogeneous network to receive the call.

DESCRIPTION OF DRAWING

The invention will be further understood from the following detailed description of a preferred embodiment taken in conjunction with the appended drawings, in which.

DESCRIPTION OF PREFERRED EMBODIMENT

Figure 1:
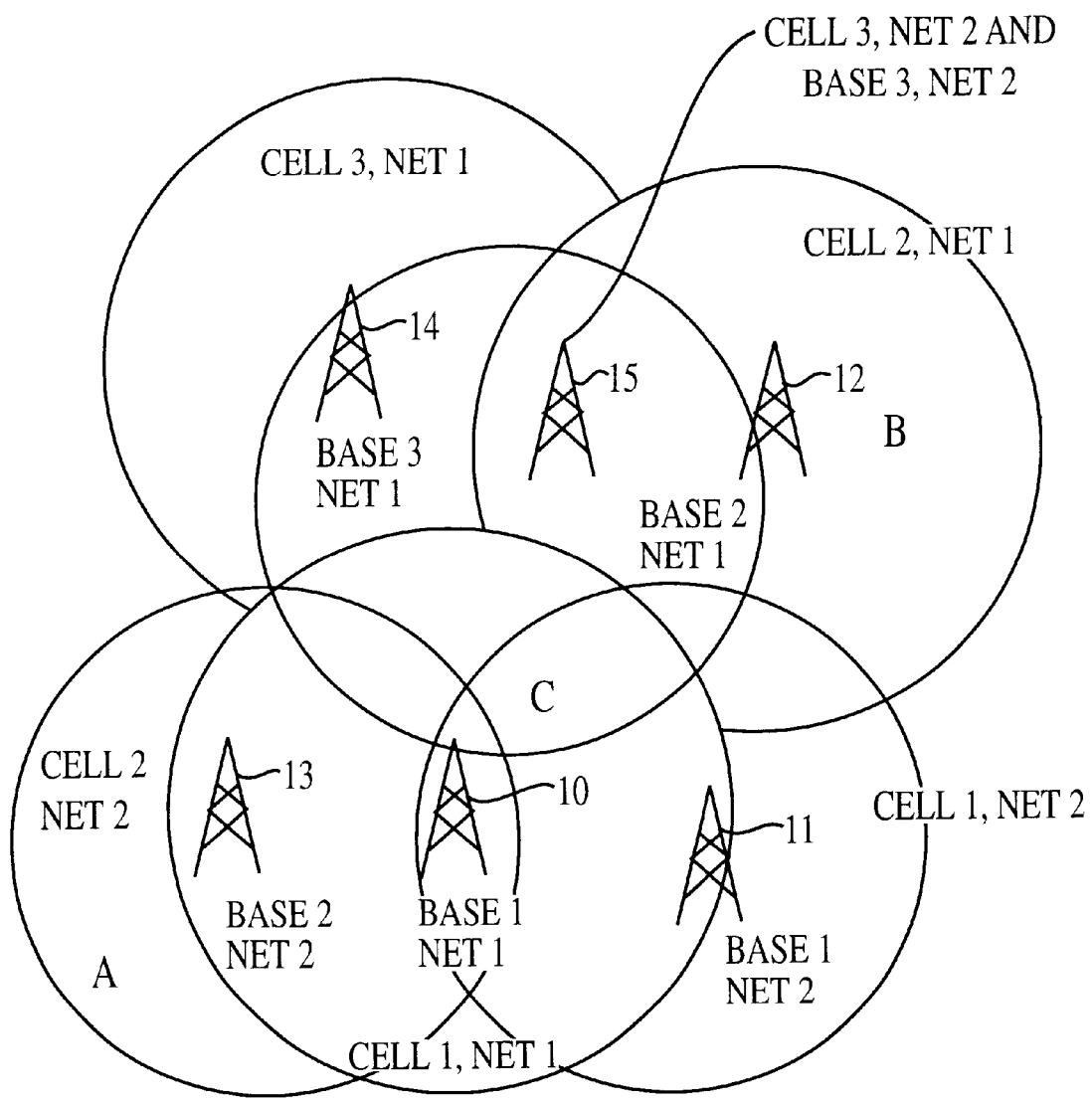
FIG. 1 is an overview of prior art overlapping, multi-cell; heterogeneous wireless telecommunication networks in a geographic area in which the present invention is incorporated.
Figure 1A:
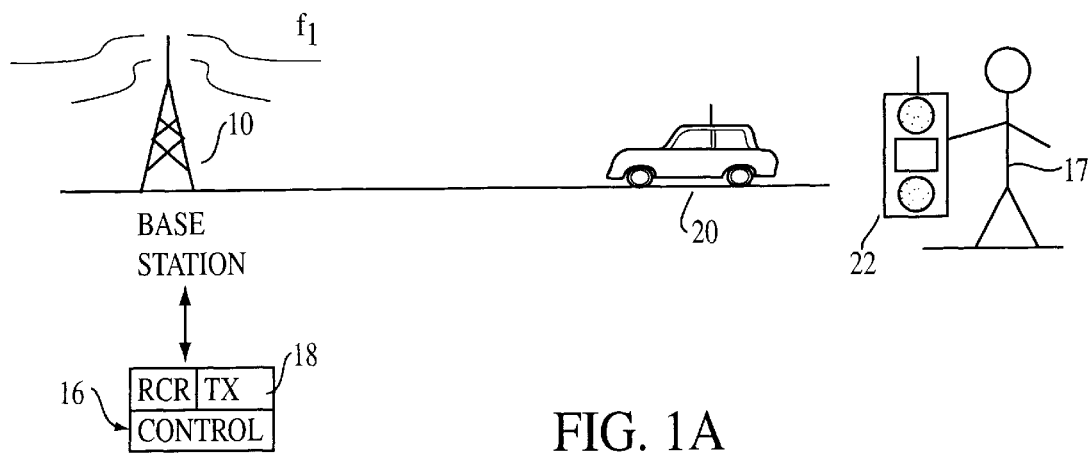
FIG. 1A is a representation of a mobile user in the heterogeneous networks of FIG. 1.

In FIG. 1, overlapping heterogeneous wireless networks 1 and 2 using different communication protocols in a common geographic area include multi-cells 1, 2 and 3, each cell including a base station. Base stations 10, 12 and 14 serve net 1 cells 1, 2 and 3. Base stations 11, 13, and 15 serve net 2 cells 1, 2 and 3, respectively. In FIG. 1A, the net base station 10 is coupled to a control terminal 16 via transceiver 18. The base station may be connected to multiple telecommunication switching office (not shown). The base station 10 transmits a base frequency carrier which is received by a user 17 in a vehicle 20 or a handset 22 carried by the user or installed at some permanent location (not shown). The mobile units 20, 22 or permanent station transmit and receive communications over the base frequency in a manner well known in the art. A network service supports the individual cells in each net and ties them together into a large network, allowing for transitions from one cell to another as the user roams in the network All of the user-base station interaction takes place within one network coverage pattern. Such networks know in which cell a user is operating and typically by using signal analysis method related to signal strength, the network makes decisions as to which cell should carry the call as the user moves within the area. Several cells typically receive enough of a signal to try to service the call. By working with the network, one cell is chosen to carry the call until the signal strength reaches a preset limit of degradation. At that time, other adjacent cells are asked to see if they can better carry the call, again, primarily based on signal strength and noise parameters. If a better cell site is located, the call is dynamically reassigned to that cell site, and the device is asked to switch to a new, vacant channel. Service decisions are made by a network-switching center. The user is unaware of the operation of the protocol and is accustomed to dialing and receiving services.

Figure 2A:
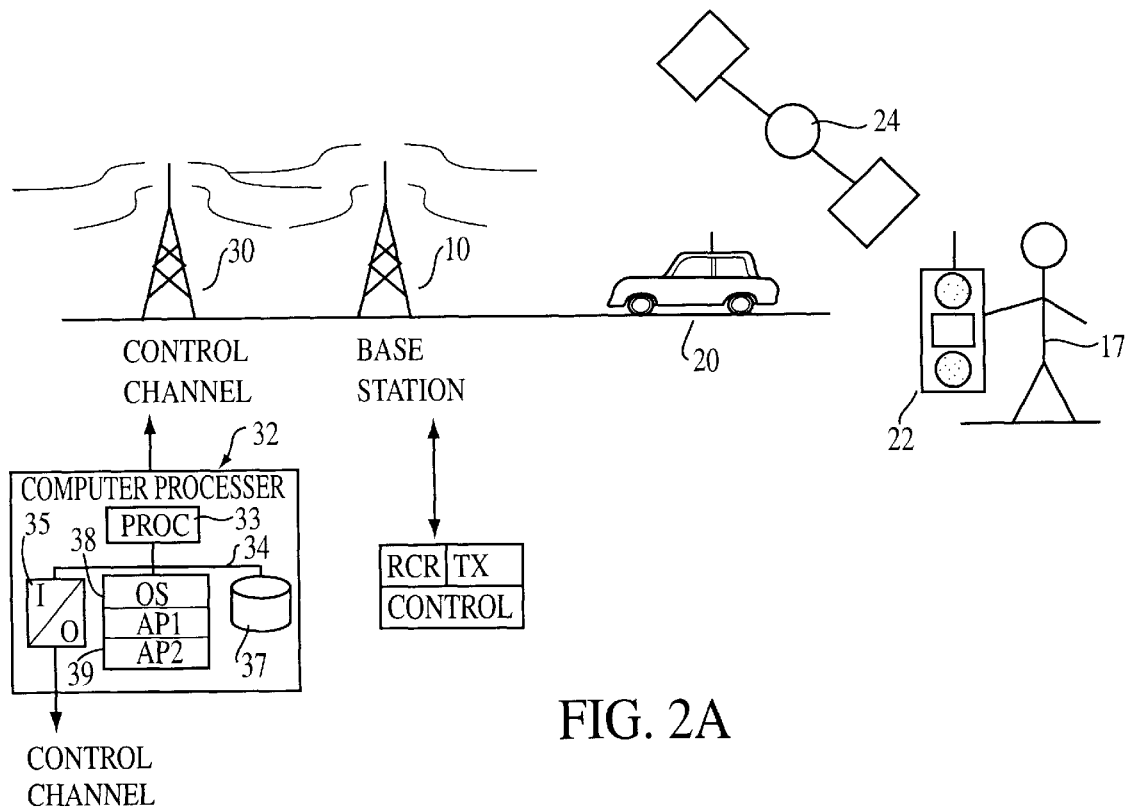
FIG. 2A is a representation of a Central Selection Agency (CSA) incorporated in FIG. 2 for performing network selection.
Figure 2B:
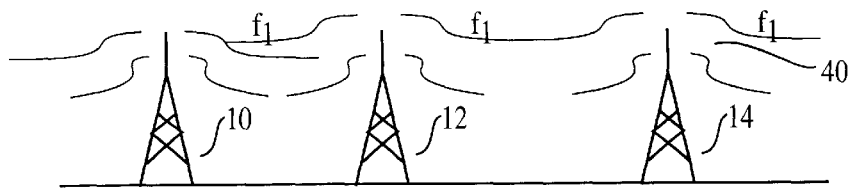
FIG. 2B is a representation of a common command channel shared among several overlapping heterogeneous wireless networks for user selection of a carrier without a CSA and incorporating the principles of the present invention
Figure 2:
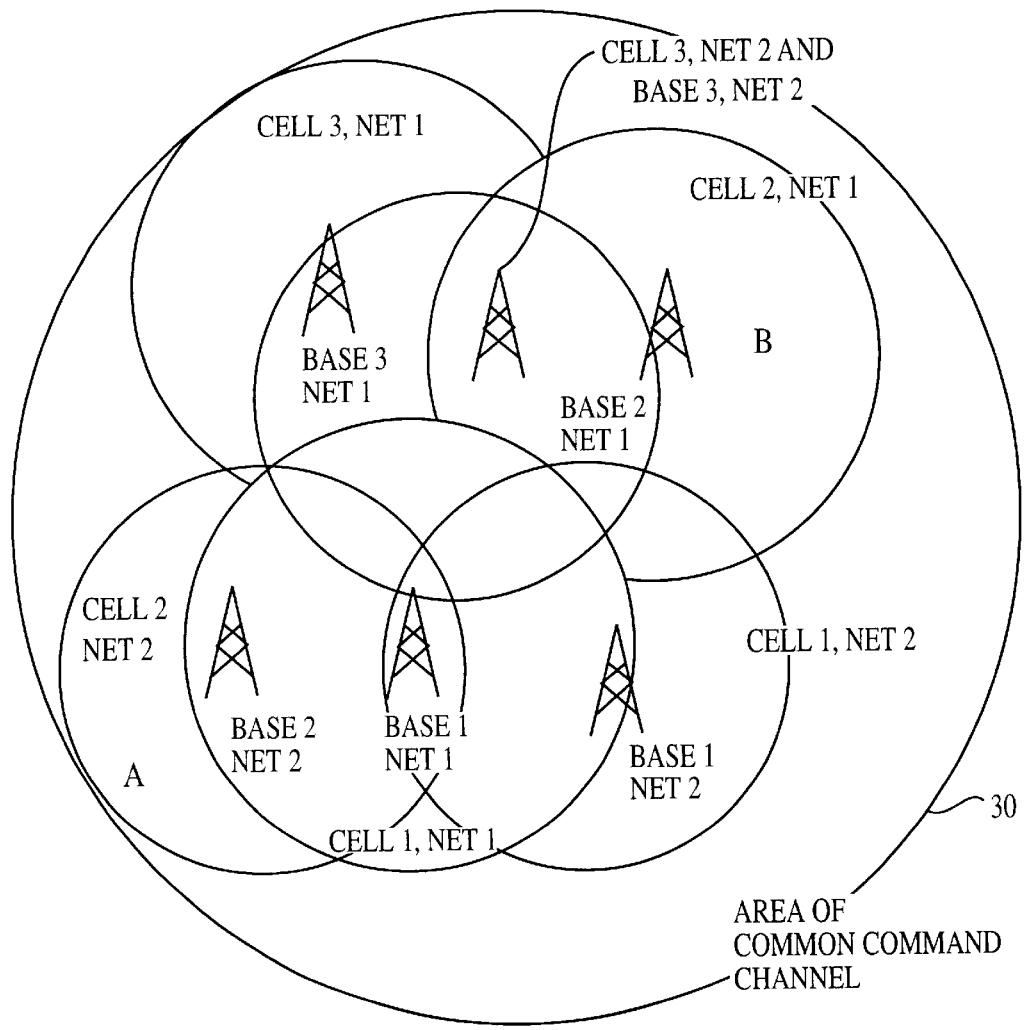
FIG. 2 is a representation of overlapping, multi-cell, heterogeneous wireless networks including a common command channel accessible to users for network selection and incorporating the principles of the present invention.

In FIG. 2, a geographic area is served by two or more different protocol networks, e.g. net 1 and net 2. Cells 1, 2 and 3 in the net 1 overlap to provide communication coverage for the user. Cells 1 and 2 of net 2 also overlap and cover a slightly different area. Note, there are areas covered by net 1 which are not covered by net 2 and vice-a-versa. There are also areas covered by both networks. Users with access to only net 1 will not receive coverage at point "A". Users with access to only network 2 will not receive coverage at point "B". Users at point "C" may have coverage from net 2's cell 1 or net 1's cell 1 or cell 3 net 2. but does not allow for user selection of a different net in the geographical area served by the net.

When communication networks compete, as is the case today with AMP, CDMA and TDMA options, a user in a metropolitan area is likely to be with coverage in three or more communication networks. At any given location and time dependent upon load, position, building interference, any of these services might provide the best service for a given user. As shown in FIG. 2A, user calls from the vehicle 20 traveling in a geographic served by overlapping different network may be handled via a common command channel 30 serving the different networks in a manner analogous to the way in which AMP calls are handled. The common command channel 30 is coupled to Central Selection Agency (CSA) 32 to make network/base station choices and optionally maintains a home location register for each user. The CSA includes a processor 33 coupled through a bus 34 to an I/O device 35, a memory 36 and a database 37. The I/O device is connected to the command control channel 30. Each user stores a profile (not shown) of communication preferences and connection capabilities in the database 37. The memory 36 includes an operating system 38 and application programs 39 for processing information received from the user to select one of the overlapping carriers for communication purposes. The application programs AP1, AP2 stored in the memory are algorithms processing the received information from the I/O device to carry out the user preferences indicated in the user profile stored in the database.

The Central Selection Agency has several methods it can use to determine where the user is and where the next network attachment point should be. In the case of a user device with built-in location capability such as GPS, the device can be queried for its location, or on a regular basis to determine both location and direction for the purposes of calculating the optimum hand-off point. If the device does not have built in location capability, the CSA could query the network to which the device was originally attached and determine the current "cell" in which it is operating, as well as the network's determination of other nearby cells that the hand-off could occur to. In the case of a boundary condition where the current network has no adjacent cells to hand off to, the network would report to the CSA that the user was traveling out of range of a specific cell boundary. Using the CSA database of network providers in a given area, the new appropriate network would be notified of an incoming user. The CSA would also notify the user's device of the new network being transferred-to, it's frequencies and protocols, and other operation characteristics such as traffic congestion, bandwidth availability and so forth. The user (or the users application) can then either continue the call or terminate it based on the above information and suitability of the next network to continue the call. For example, a high bandwidth connection on the original network may not be supportable on the "next" network due to facilities or traffic congestion. Based on this, the user may elect to remain with the network to complete the call, or may continue to move and discontinue the call, or continue to move and accept a lower speed connection and continue the call. In any case, the CSA records are updated, and the billing files reflect the changes. In this case, all the networks share the common control channel and the support of the CSA so the hand-off is coordinated among all the participants by the CSA. The wireless side of the hand-off has been described above. Equally necessary is the ability of the wire line side of the call to follow the wireless user from network to network. Again, the CSA coordinates this activity.

Since the original call connection was through the originating networks landline gateway (or MTSO), the CSA knows which network has the landline termination. As the user moves within this network, moving the landline termination is typically not necessary, but in any case, an internal design consideration of that network When the user travels outside of the region controlled by this network, the CSA tells the originating network to "forward" the call to the "next" network that will receive it. The CSA, likewise, advises the "next" network (as noted above) of arriving traffic on the wireless side, and of arriving landline connection to map to that wireless user.

In the case where the networks do not have a common control channels, or do not support the use of the CSA, the hand-off is quite different. In this case, the end user device controls the hand-off, and does so in much the same way a call is initiated. The device listens to the surrounding wireless signals on the channels described in its local database, selects the appropriate network based on the database information, and initiates a call to the new network. The receiving network, seeing this is a "hand-off call" as opposed to a "new call", sends a "connect-to" number to the end user device. The device then sends the connecting-to number to the original network as a "forward-to" message so that the original network will forward the landline connection to the appropriate receiving switch port in the "new" network. At this point, the device switches to the new network and the call continues as before.

When a call is placed to the user device 22, a calling party is directed to the CSA which checks the visitor home location register to determine the last known location. The user device is then informed via the common command channel that a call is waiting. The user device selects a network and base station to receive the call in a fashion similar to that of placing the call. Alternatively, incoming calls can be handled via other communication networks. For example, if the device has paging capability, the user may receive a page with the information regarding the in-bound call. The user then can place an out-going call to the calling party in the manner previously described.

Continuing in FIG. 2A, a satellite system 24 may be used to provide precise geographical information to the vehicle 20 or user 22 for locating their respective positions with respect to the base station. The geographical information may be used in lieu of signal strength to assign a frequency to the vehicle 20 or user 22 for communication purposes. The user devices 20, 22 equipped with geographical location means can select a carrier based on the geographical location. The geographical location means can include a satellite connection or manual entry location information or local transmitters providing location information. With such information, the user device broadcasts its ID, location and connection capability requirements on the common channel 30. Preferences may also be transmitted by AMP networks. In such case, the user broadcasts an ID (consisting of a serial number) and a telephone number alone. The command channel receives the request and transfers the information to the CSA. Note that the command channel is a logical channel and may be comprised of several different frequencies and protocols to conform to today's standard network implementations. For example, GSM uses 1800 MHz in Europe; 1900 MHz is used in the United States. TDMA and CDMA are basically U.S. implementations that both use 1900 MHz. but have different protocols.

In another embodiment, as shown in FIG. 2B, a shared command channel 40 operated by several base stations, e.g. 10, 12, and 14 is substituted for the control channel and CSA 32 of FIG. 2B. Using the shared command channel 40, participating networks may broadcast their location, frequency availability and bandwidth price from their local base stations. User devices which wish to make connections and which know their location either through GPS or manual entry, or through other means, can determine which base stations are sufficiently close to make a carrier selection and a protocol selections based from the common channel information. The user device then shifts to the required frequency, protocol and initiates the connection.

In still another embodiment, no common command channel or Central Selection Agency is required. A user device with geographical location means includes algorithms to determine a desired network and base station directly without recourse to a CSA. The database contains an internal algorithm which indicates which network, protocol and base station to access from the location at the particular time. In such an embodiment the inclusion of cell or network load as a parameter to the user decision is not available.

In the event the carrier selection process within the device yields multiple options, the user contacts each of the networks and base stations separately to determine the advisability of using that network and base station for communications. After some or all of the indicated networks have been contacted, the user can make the selection of which network, protocol, or base station to access.

Figure 3:
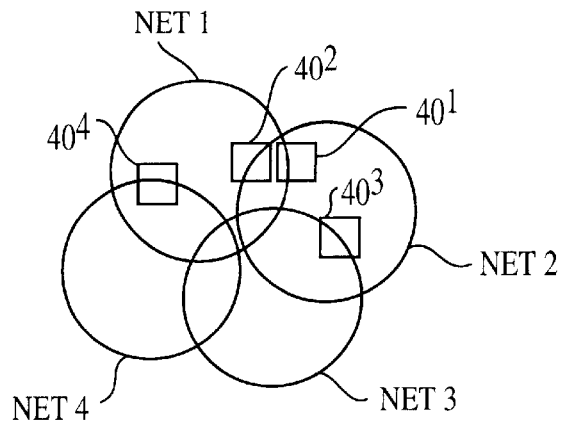
FIG. 3 is a representation of edge nodes in overlapping heterogeneous wireless networks for assisting a user in selecting a carrier, and incorporating the principles of the present invention.

In FIG. 3 another embodiment is shown for user carrier selection among overlapping networks 1 . . . N without direct use of a command control network or Central Service Agency or shared channel. Each network includes locating carrier edge nodes or terminals $40^1$, $40^V$ along the outer edge of each carrier geographical area. A plurality of edge nodes may be installed in each network In one example, a PBX or other terminal serves as an edge node and is modified to provide a special carrier frequency used as a default command frequency. Within a network the edge node would allow a previously unaffiliated user device to tune to the default command frequency and access the edge nodes. Each edge node knows its location, and obtains the preference/profile of the user device from a database in a network with which the user is associated. The edge node mediates the selection of an appropriate network connection to a carrier. The carrier selection may be based on load costs as determined by the user. In this embodiment an enterprise, e.g. a convenience store, restaurant, etc. can become "micro-Local Exchange Carriers (LEC's") and provide a component of the transport for unaffiliated user devices. As such, the enterprise as a local exchange carrier serves as a receiver for a user wireless call and provides a wireless or wireline connection to a command channel and CSA for a selection of a carrier for user based on the known location of the local exchange carrier. The local exchange carrier is installed in the enterprise in the form of a small receiver box located in one or more areas of the enterprise. The receiver is coupled to a wireline or a wireless transmitter for connection to the CSA. The local exchange carrier would be low cost and extend the coverage of the network. Payment may be part of the initial connection exchange or may be derived from the network in which the call is placed. In many cases, the wire line carriage is significantly less than wireless carriage, and therefore and an inducement to both the end user and the enterprise to make such an arrangement.

The operation of the invention will now be described in a process 40 in conjunction with FIGS. 2A and FIGS. 4–6 for various carrier selections by a user.

Figure 4:
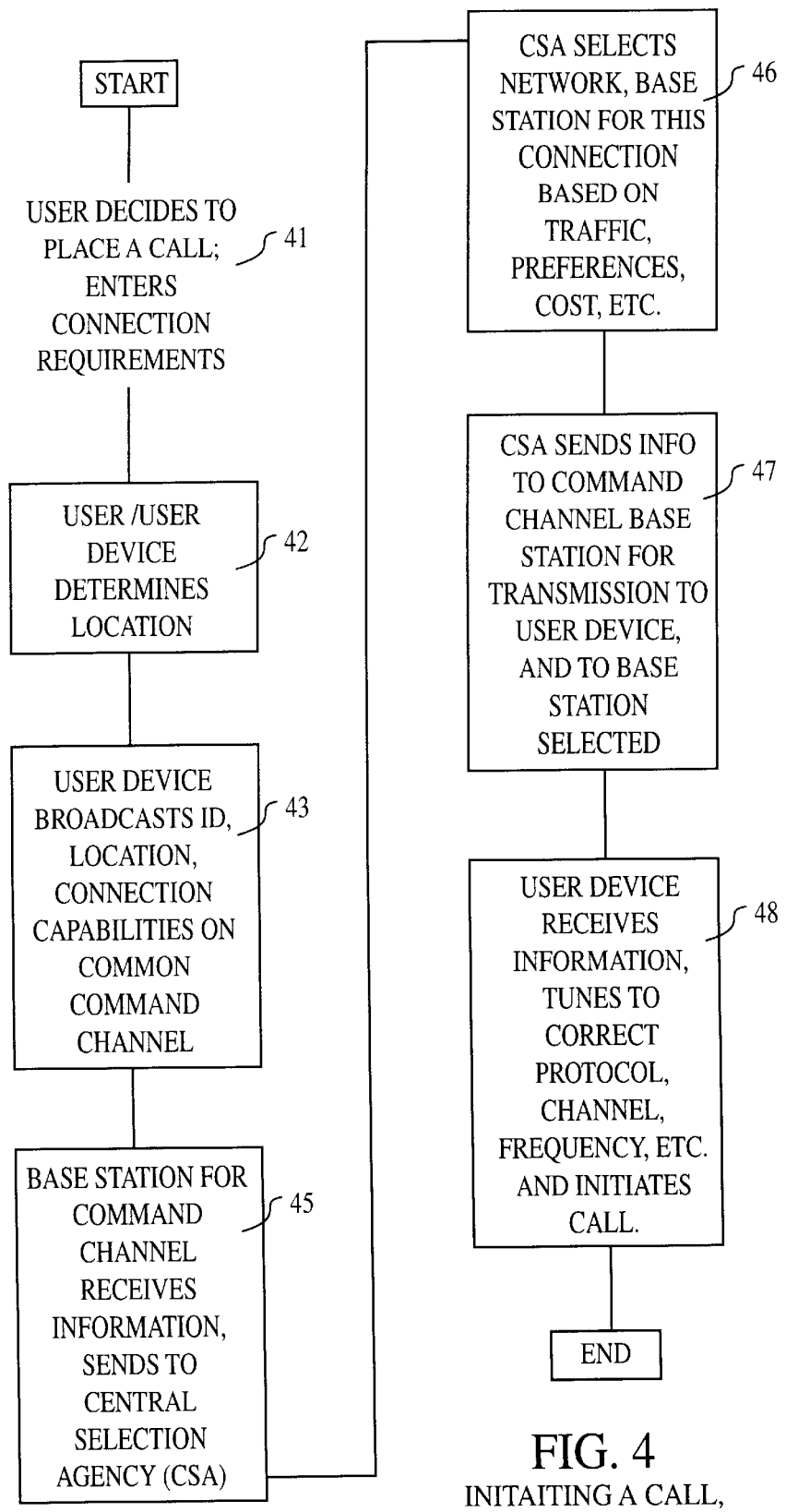
FIG. 4 is a flow diagram for a user in FIGS. 2, 2A, 2B and 3 initiating a call in the system of FIG. 2A.

In FIG. 4 a call is initiated in a geographic area including heterogeneous overlapping carrier networks. A common command channel and a Central Selection Agency are shared by the networks. In step 41 a user decides to place a call and enters the connection requirements if they are different from the default connection requirements (price, bandwidth, etc.) which the user device normally operates under and described in a profile stored in the database 37. In step 42, the user or user device determines its geographical location and includes the location in the connection parameters. The user location may be determined by GPS coordinates or physical addresses of nearby physical locations or positional information provided by local transmitters. In step 43 the user broadcasts an "ID", location information, connection capabilities, and requirements on the common command channel. In step 44, the base station associated with the common command channel transmits the user information to the Central Selection Agency. In step 46 the CSA selects a network and base station for the connection based on traffic preferences, costs, etc., described in the user profiles stored in the database 37.

In step 47, the CSA forwards the selection information to the associated base station for transmission to the user device and to the base station selected. In step 48, the user device receives the carrier selection information and initiates the connection by tuning to the correct protocol, channel frequency an initiates the call after which the process ends.

Figure 5:
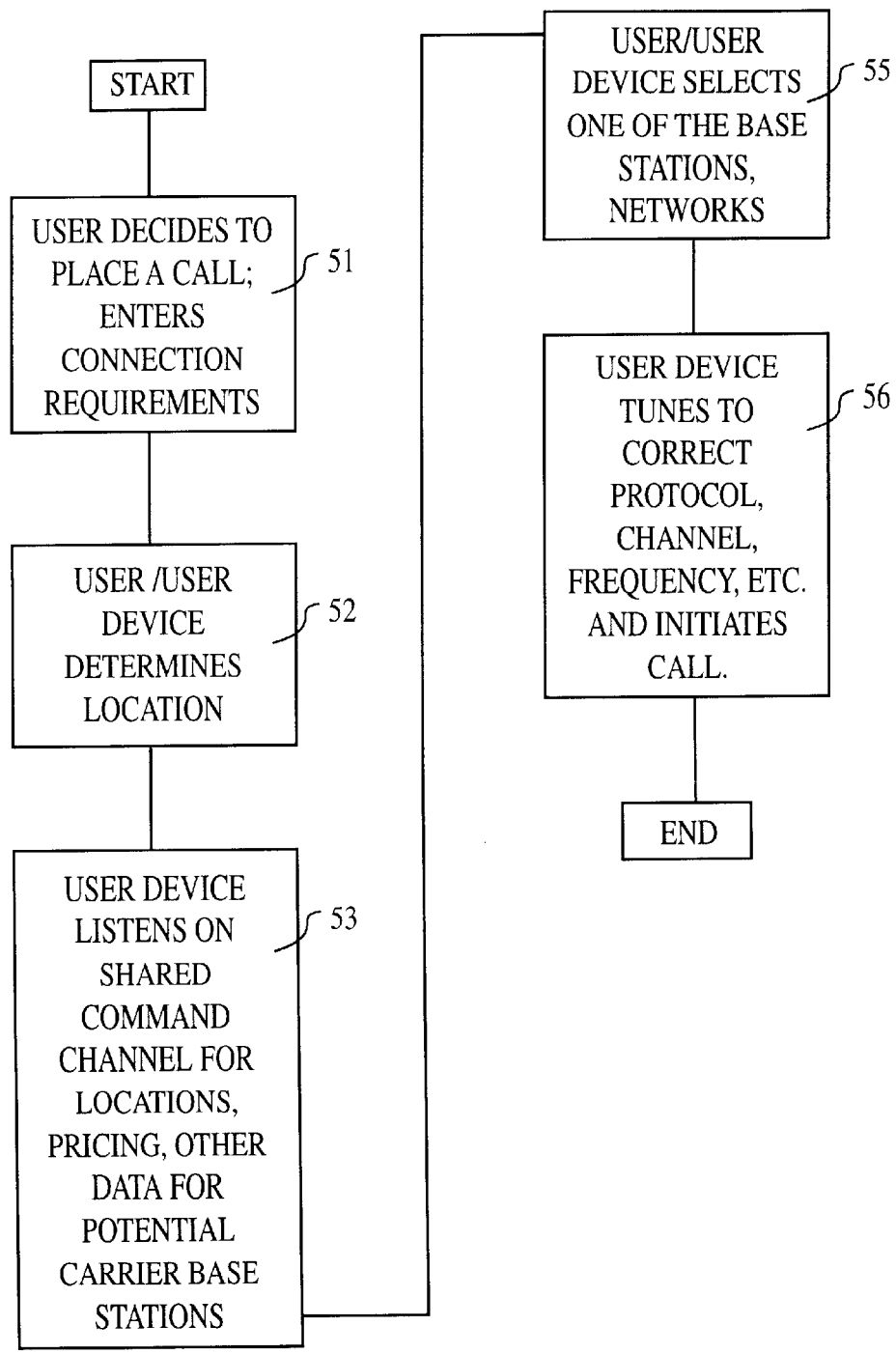
FIG. 5 is a flow diagram for a user initiating a call in the system of FIG. 2B for an overlapping telecommunication network without selection agency but including a shared command channel.

In FIG. 5, a process 50 is described for initiating a call without a Central Selection Agency and using a shared command channel described in connection with FIG. 2D. In step 51, a user deciding to place a call enters connection requirement information on the shared channel. In step 52, the user device determines its geographical location for network selection purposes. In step 53, participating carriers broadcasts their location, frequency availability, and bandwidth price from local base stations in the shared command channel and the user device listens on the channel for locations, pricing, and other data of potential carrier-based selection. In step 55, the user device receives and stores carrier information in a buffer, after which an algorithm processes the information to select one of the base station networks, and in step 56, tunes to the correct protocol, channel, to initiate the call after which the process ends.

Figure 6:
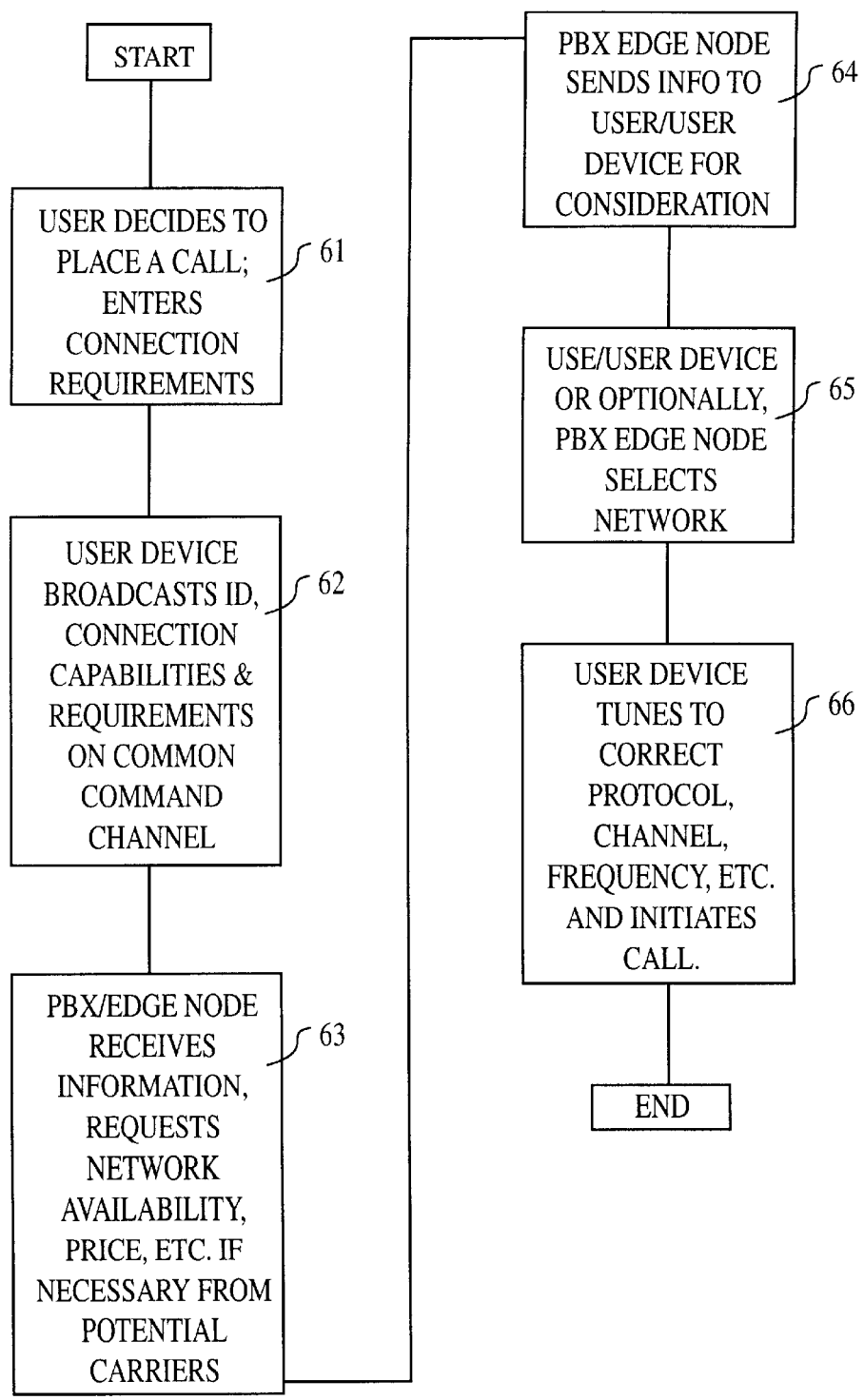
FIG. 6 is a flow diagram of a user in the system of FIG. 3 initiating a call in overlapping heterogeneous networks including an edge node for mediating call selection.

In FIG. 6, a user initiates a call to a carrier including a PBX/edge node in a process 60. In step 61 a user decides to place a call with connection requirement on a default command frequency described in conjunction with FIG. 3. In step 62, the user broadcasts an ID, connection capabilities and requirements on the default command frequency. In step 63, a PBX/edge node receives the information. The node requests network availability, and price from potential carriers. In step 64, the edge node sends the carrier information to the user device for selection purposes.

In step 65, the user device processes the carrier information using a stored algorithm or optionally the PBX/edge node selects the network. In step 66, the user device tunes to the correct protocol channel frequency and initiates the call after which the process ends.

Figure 7:
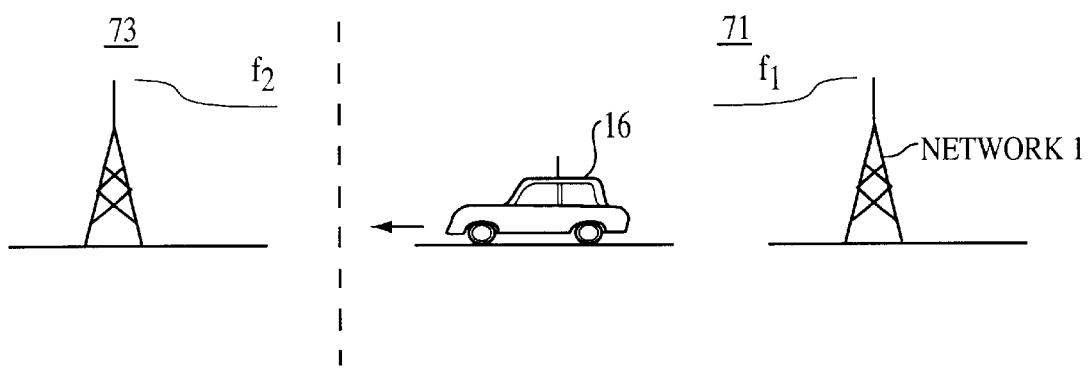
FIG. 7 is a representation of a handoff between overlapping heterogeneous wireless networks in FIG. 2 operating at different base frequencies.

FIG. 7 is a representation of a handoff of a user call between different networks. A traveling vehicle or mobile user 16 exits one carrier network 71 operating at F1 and enters a second overlapping carrier network 73 operating at F2. Both carriers may also employ different protocols. Today's networks hand-off a user from cell to cell within the boundaries of that network, but not between different networks. The present invention allows the mobile user 16 to be transferred from one network to another different network The moving vehicle or user device 16 is equipped to provide positional information during passage in the network. A Central Selection Agency (see FIG. 2A) monitors the positional information over the common command channel 30. When the moving vehicle enters the overlapping area, the Central Selection Agency exercises a handoff algorithm 800 (to be described in FIGS. 8A–8D) using user profile information to determine if the network connection should be changed or continued. In such case, the Central Selection Agency maintains the connection while a new network base station is selected and the call continued.

FIGS. 8A–8D describe an internetwork handoff process 800 between network one (1) and network two (2) for mobile station ("MS") 16 shown in FIG. 7. In step 801; network one (1) detects an impending handoff required for a mobile station using conventional means. A test is performed in step 803 to determine whether there are other cells of network 1 currently available. A "yes" condition initiates step 804 and handoff occurs as normal, after which the process ends. A "no" condition initiates a test in step 805 to determine whether the call is supported by a central selection agency or a system control channel. A "no" condition transfers the handoff process to entry point B shown in FIG. 8D which will be described hereinafter. A "yes" condition initiates a step 807 to notify the central selection agency of an impending handoff requirement. In step 809, the central selection agency checks an internal database for network 2, indicating use based on location, types of calls allowed and other network 2 parameters. In step 811, the central selection agency forwards to network 1 information regarding network 2 with respect to configuration rules, protocols and a "forward-to-telephone number". In step 813, network 1 sends the user data to the end user and retains a "forward-to-telephone number" for its own use and the process transfers to entry point B shown in FIG. 8C. Simultaneously, the central selection agency in Step 815 sends an incoming traffic message to network 2 after which the process transfers to entry C shown in FIG. 8C.

At entry point B, the end user in Step 817, checks to determine if the proposed network 2 connection is acceptable. A test 819 is performed. In performing the test, the end user determines the message rate, bandwidth, message quality and other factors from the information provided in step 813. A "no" condition initiates step 821 in which the end user rejects the handoff. The central selection agency is notified of the rejection in Step 823 and the transfer cancelled, afterwhich the process ends.

A "yes" condition for the test 819 initiates a step 825 in which the end user device changes to network 2 settings and drops the network 1 call. Network 1 sees the loss of call and forwards the landline connection to network 2 in Step 827. The call continues in network 2 in step 829 and the handoff is complete. The central selection agency updates its database and billing files in step 831, afterwhich the process ends.

At entry point C, network 2 picks up the end user via the shared command channel in step 816. Network 2 maps the user to the landline port in step 817 and the call continues as before in step 829.

Figure 8A:
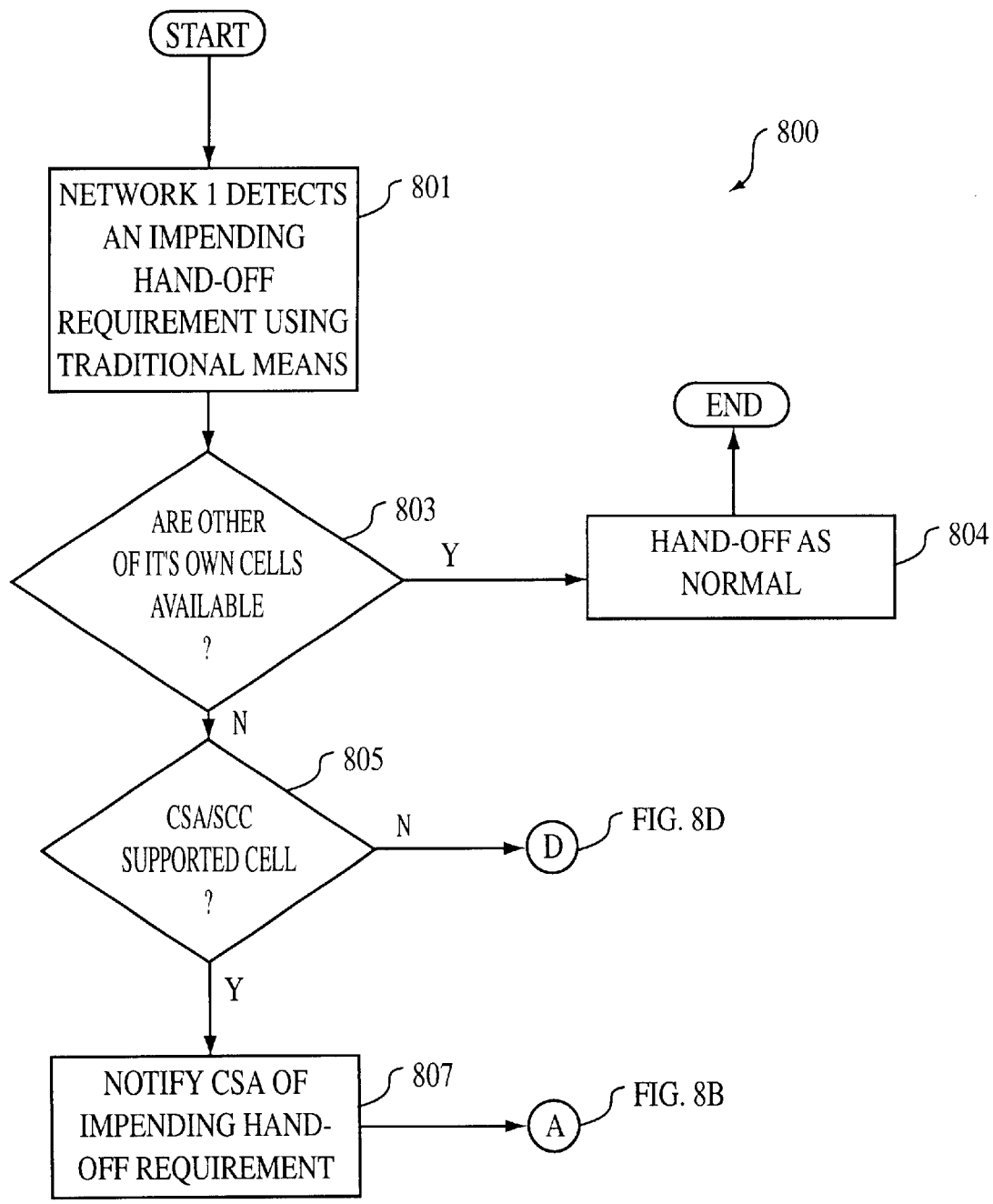
FIGS. 8A–8E is a flow diagram for handover of calls in FIG. 7.
Figure 8B:
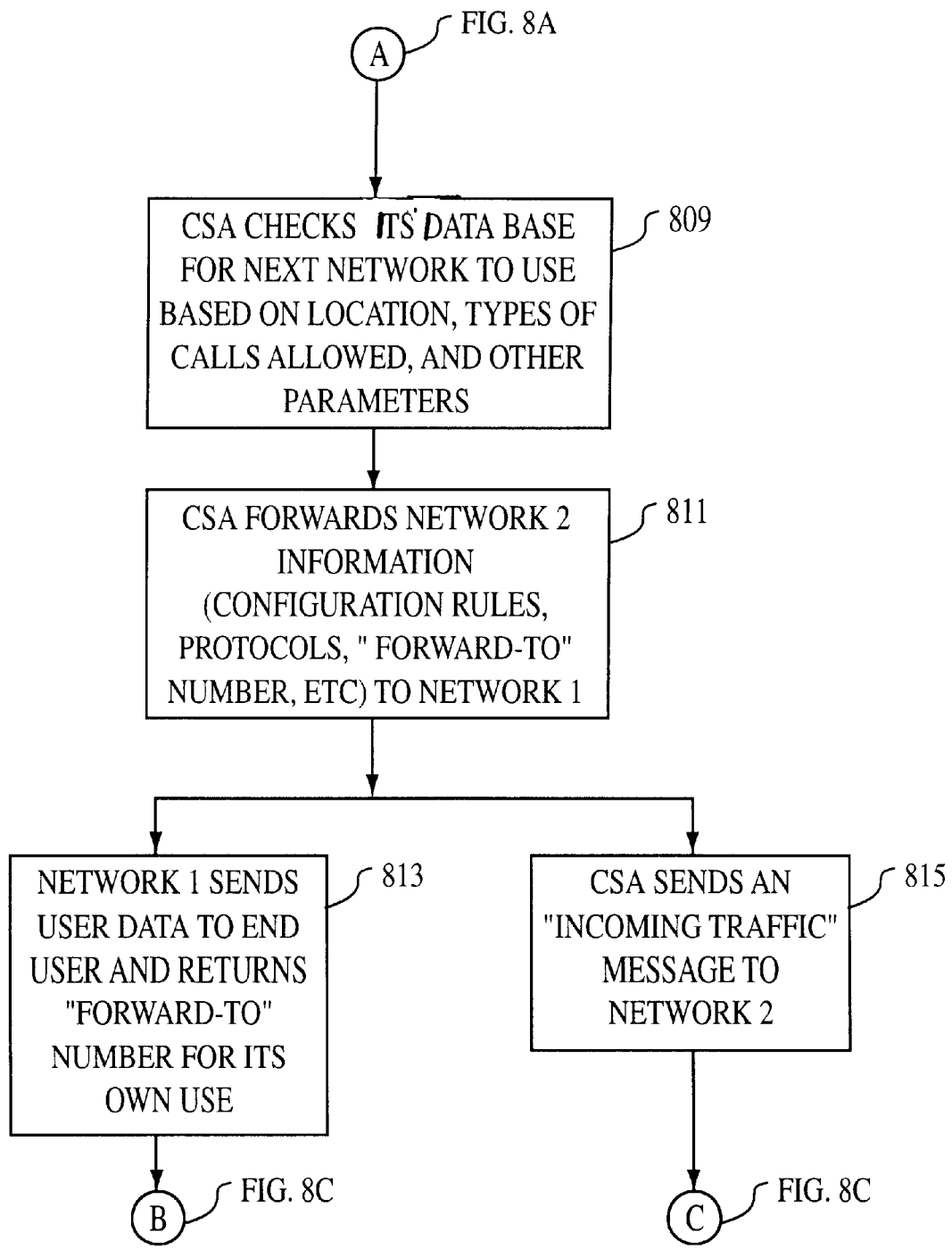
Figure 8C:
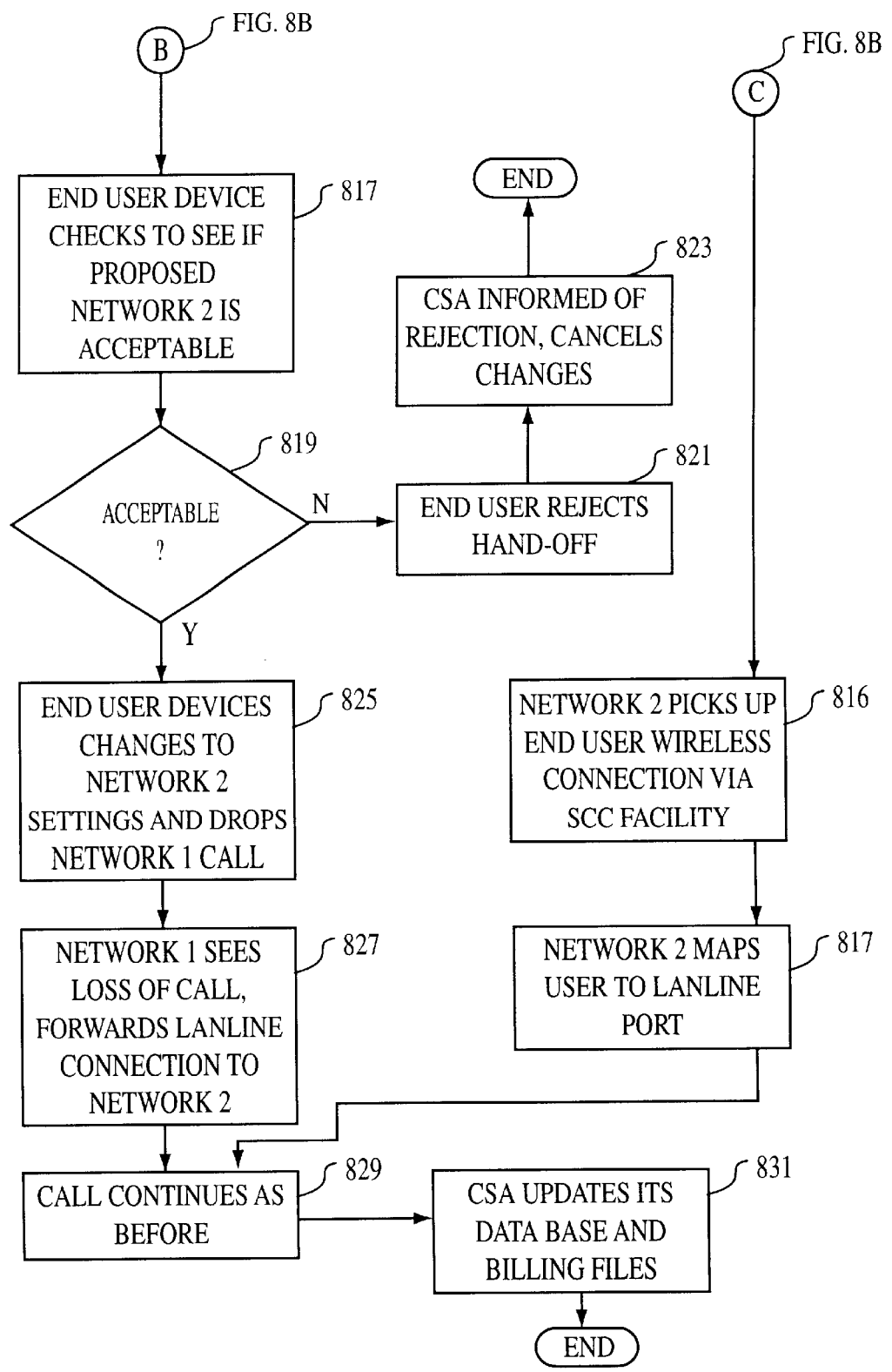
Figure 8D:
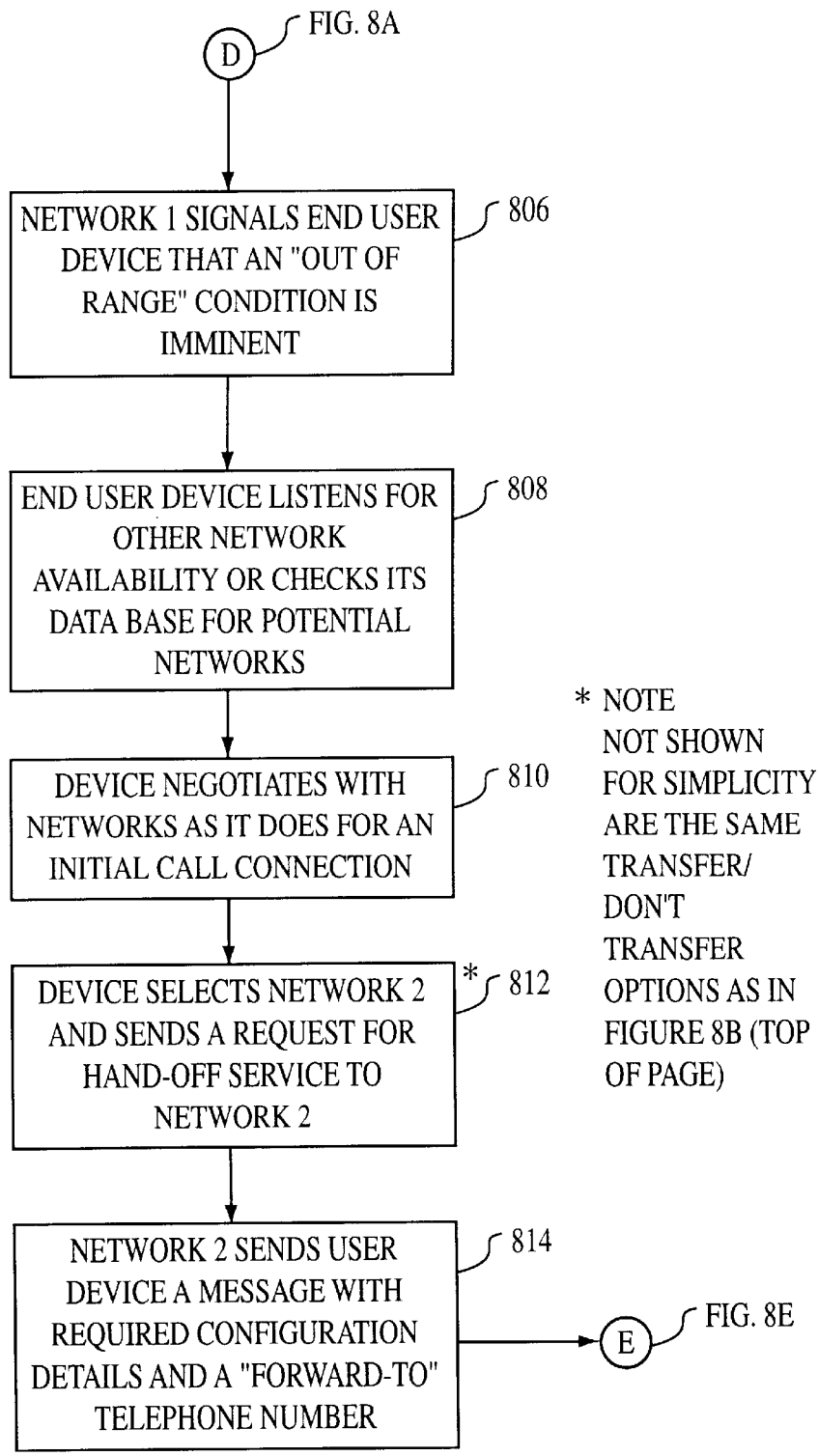
Figure 8E:
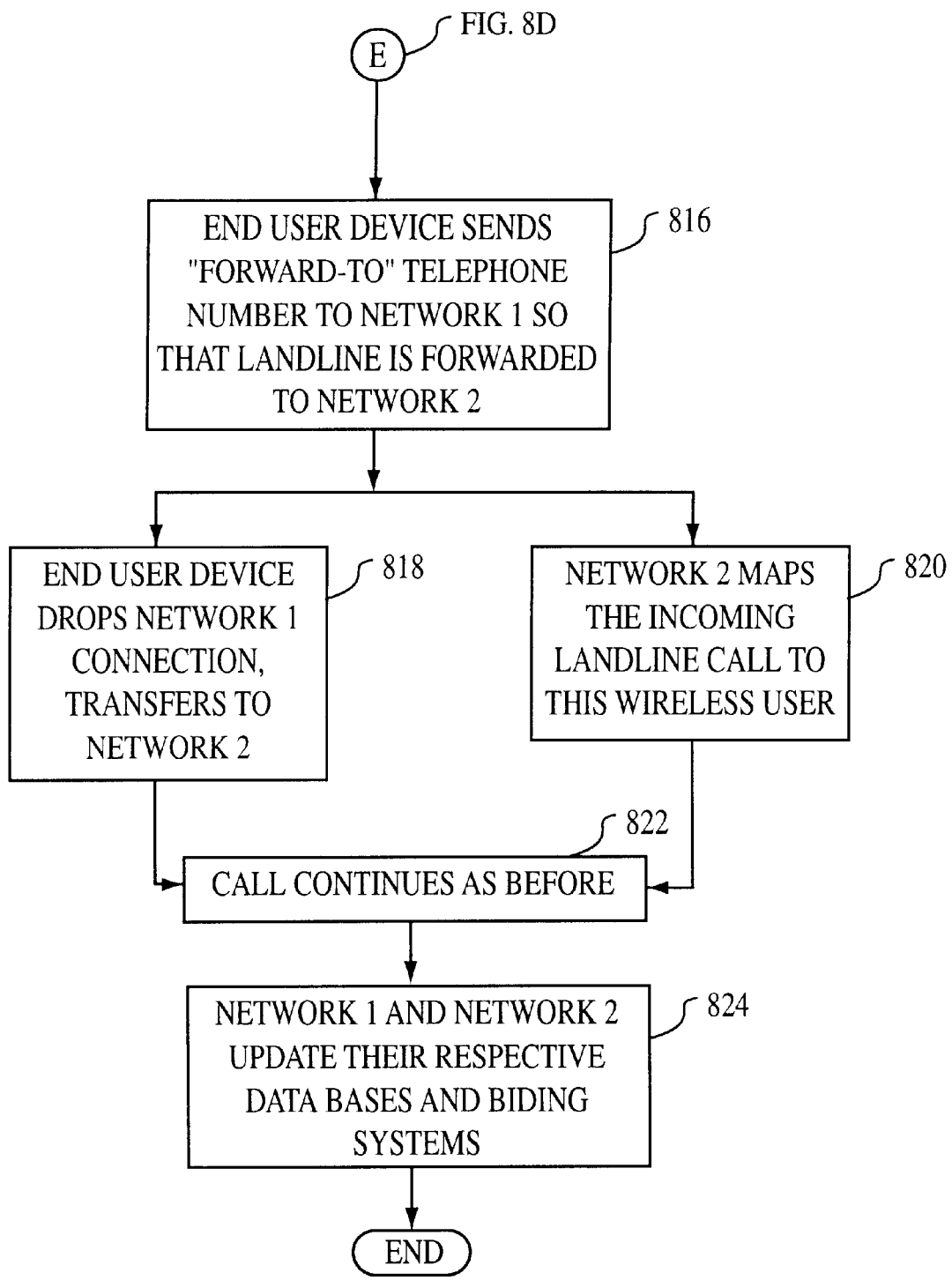

In FIG. 8D, network 1 signals the end users that an out of range condition is imminent in step 806. The end user device listens to other networks available or checks its own database for potential networks in step 808. Instep 810 the end user device negotiates with the available network as the device does for any initial call connection. In step 812 the end user device performs a network acceptable test previously described in step 819 and sends a request for handoff service to network 2. In step 814 network 2 sends the user device a message which requires configuration details and a "forward-to-telephone number". The process transfers to entry point E shown in FIG. 8E. In step 816 the end user device sends the "forward-to-telephone number "to network 1 so that land line is forward to network 2. In step 818 the end user device drops network 1 connection and transfers to network 2. Simultaneously, in step 820 network 2 maps the incoming landline call to the wireless user. The call continues in step 822 and networks 1 and 2 update their respective databases and billing systems in step 824, afterwhich the process ends.

Besides heterogeneous networks, the present invention has application in a homogenous network including a mobile switching station using the absolute location of a mobile device to select the base station. In addition to user signal strength, which may be temporarily compromised by natural features, the user's absolute location can be used by the mobile switching office as part of a selection algorithm incorporating the user profile. The base selection by the mobile switching office can be reviewed and altered by the user device as described in FIGS. 8A–8B. When look ahead routing is used, the mobile switching office can determine the next likely set of cells to be involved and use this information in the selection of a base station, subject to review by the user station device. Knowing the mobile device's destination, the mobile switching office may provide the user device lower quality initially, but becoming increasingly better quality as the user device travels to the destination.

The present invention provides enhanced security for wireless calls on the originator's end of the call. The end user or associated device can select a network best suited for an intended call from among several networks providing coverage in the area. To increase security on the wireless portion of the call, the user or originator can program the wireless device to change networks at pre-set or random periods during the call. The network hand off on the wireless side and the call forwarding on the wireline side operate as previously described in FIGS. 8A–8D. To the networks involved, the call appears as a series of handoffs from network to network initiated by the user rather than by signal conditions. Such "network hopping" is different than "channel hopping" in that the "network hopping" may involve protocol and other changes which is not the case in "channel hopping".

Summarizing, the present invention provides users in heterogeneous overlapping wireless networks to select among the carriers through the use of a common channel and CSA or shared channel without a CSA. Both channels contain user profile information which can be processed by an algorithm to select the preferred carrier based on geographic location or other factors advantageous to the user. The invention further provides users in homogenous networks to select a preferred base location knowing the location of the user device with respect to the base station. The user may also incorporate a processor in the handset to exercise an algorithm for selecting a carrier based upon information received from the command channel or shared channel or information broadcasted by the carriers and available to the user. The advantage of such telecommunication selection is clear. With a protocol agile device, the user can obtain communications desired at the best price. Additionally, since there is no universal coverage by any given network provider, this invention enables a user to piece together their own universal coverage by taking advantage of all carrier network build outs rather than just picking one. The invention offers advantages to carrier providers. Carrier providers now have a way to balance loads in their cells. If a cell is relatively idle, a carrier provider can drop the price to entice more traffic. If high bandwidth for data communication is required, or more profitable, a provider can offer a higher bandwidth to the requesting device.

While the invention has been described in a preferred embodiment, various changes may be made in the spirit and scope thereof without departing from the invention as defined in the appended claims, in which.

We claim:

1. An improved wireless telecommunication system providing users with carrier selection in overlapping heterogeneous wireless networks, comprising:
   (a) a plurality of wireless networks using different frequencies and protocols in the overlapping heterogeneous wireless networks;
   (b) a common command channel linking all networks, the channel providing user information indicative of a user's calling preferences, and providing access to the user's home location and visitor location registers;
   (c) a Central Selection Agency (CSA) coupled to the command control channel and storing profiles of user network preferences; and
   (d) a user device coupled to a network for a call received on the command control channel; recognized and assigned by the Central Selection Agency to a network depending on the user profile information, the assigned network being electable by the user thereby providing the user with a preferred protocol, bandwidth, and cost.

2. The system of claim 1 further comprising:
   a local exchange carrier in an enterprise for transporting a call to a central selection agent for selection of a carrier to serve the user call.

3. The System of claim 2 herein the central selection agency is a processor coupled to the control channel and processing calls from mobile user devices for carrier selection in accordance with user information stored in the processor and incorporated into an application program for a selection of the preferred carrier network to serve the user device at a location defined in the user call.

4. An improved wireless telecommunication system providing users with carrier selection in overlapping heterogeneous wireless networks, comprising:
   (a) a plurality of wireless networks using different frequencies and protocols in the overlapping heterogeneous wireless networks;
   (b) a common command channel linking all networks, the channel storing user information indicative of a user's calling preferences, and providing access to a home location and a visitor location registers;
   (c) a Central Selection Agency (CSA) coupled to the command control channel;
   (d) a user device coupled to a network for a call received on the command control channel; recognized by the Central Selection Agency and assigned to a network depending on the user information thereby providing the user with a preferred protocol, bandwidth, and cost; and
   (e) wherein the central selection agency is a processor coupled to the control channel and processing calls from mobile user devices for carrier selection in accordance with user information stored in the processor and incorporated into an application program for a selection of the preferred carrier network to serve the user device at a location defined in the user call.

5. The system of claim 4 further comprising means for determining the user's device position for selecting a carrier in originating the call.

6. The system of claim 4 further comprising at least one PBX/edge node, the PBX/edge node mediating the selection of an appropriate network connection for a user based upon the user preference profile information stored in the user device.

7. The system of claim 4 wherein the user device includes geographical location means and algorithms to determine and select a desired network and base station directly as an alternative to the central selection agency.

8. The system of claim 4 in which the shared command channel provides carrier information for selection by the user.

9. The system of claim 4 wherein algorithm means in the user device determine the preferred network for communication services.

10. The system of claim 4 wherein the user device is coupled to the shared command channel and incorporates programming means to make a carrier selection based upon the shared command channel information.

11. In an improved telecommunication network system including a plurality of overlapping cellular cells using different communication protocols, frequencies and further including an internetwork command channel, a Central Selection Agency (CSA), a home location register and a visitor location register accessible to the agency, a method for obtaining communication services for a user at a preferred protocol, bandwidth, an cost comprising the steps of:
   registering user connection requirements in a profile different from default connection requirements in the Central Selection Agency;
   determining the user location and connection parameter;
   broadcasting user information including user ID, location, connection capabilities on a common command channel;
   receiving the user information at a base station and transmitting the information to the Central Selection Agency;
   selecting the network and base station for the connection and forwarding the selection to the associated base station for transmitting to the user device;
   tuning the user device to the base station and initiating a connection with the appropriate protocol where by the user is connected to the network at a preferred protocol, bandwidth and cost;
   including an edge node in a network to mediate user connection to a network, the edge node including a business model so that a local business could become a micro-local exchange carrier, comprising the steps of:
   broadcasting user information including user ID and connection capability requirements on a command channel;
   receiving the user information at the edge node which requests information regarding bandwidth availability, pricing from potential networks;
   sending the network information to the user from the edge node for selection of a carrier; and
   initiating a call by the user device to the selected network and channel.

12. An improved wireless telecommunication system providing users with carrier selection in overlapping heterogeneous wireless networks, comprising:
   a plurality of base stations, each serving a different carrier and operating a shared command channel;
   each base station broadcasting on the shared command channel their location, frequency availability and bandwidth price;
   a user device including means for determining the geographical location of the device; and means within the user device accessing the shared command channel and selecting and tuning to the selected carrier directly for communication services.

13. In an improved telecommunication network system including a plurality of overlapping cellular cells using different communication protocols, frequencies and further including a command channel, a Central Selection Agency (CSA), a home location register and a visitor location register accessible to the agency, a method for obtaining communication services for a user at a preferred protocol, bandwidth, and cost comprising the steps of:

registering user connection requirements in a profile different from default connection requirements in the Central Selection Agency;

determining the user location and connection parameter;

broadcasting user information including user ID, location, connection capabilities on a common command channel;

receiving the user information at a base station and transmitting the information to the Central Selection Agency;

selecting the network and base station for the connection and forwarding the selection to the associated base station for transmitting to the user device;

tuning the user device to the base station and initiating a connection with the appropriate protocol where by the user is connected to the network at a preferred protocol, bandwidth and cost;

informing a called user device on the command channel that a call is waiting; and selecting in the user device a network and base station to receive the call.

14. The method of claim 13 wherein the command channel is a shared channel by the networks and further comprises the steps of:

using the network device to listen to the shared channel to determine which network base stations are within range; and selecting one of the networks or base stations and initiating the connection with the appropriate protocols based upon a stored algorithm in the user device.

15. The method of claim 13 including an edge node in a network to mediate user connection to a network, the edge node including a business model so that a local business could become a micro-local exchange carrier, comprising the steps of:

broadcasting user information including user ID and connection capability requirements on a command channel;

receiving the user information at the edge node which requests information regarding bandwidth availability, pricing from potential networks;

sending the network information to the user from the edge node for selection of a carrier; and initiating a call by the user device to the selected network and channel.

16. The method of claim 13 wherein a local exchange carrier connection installed in an enterprise serves as an edge node in a network.

17. The method of claim 13 further comprising the step of:

detecting an impending handoff of a call in a first network to a second network;

notifying the CSA of the impending handoff;

checking the CSA database for call parameters of the second network;

sending an incoming traffic message to the second network from the CSA;

picking up the call by the second network;

mapping the user to a landline port by network; and updating the CSA database and billing files.

18. The method of claim 17 further comprising the steps of:

sending the second network call parameter to the user;

determining if the second network parameters are acceptable to the user;

transferring the user to the second network if the second network parameters are acceptable; and forwarding a landline connection of the user to the second network.

19. The method of claim 18 further comprising the steps of:

programming a user device to change call connections at random times from one network to a different network covering the user.

20. In an improved telecommunication network system including a plurality of overlapping cellular cells using different communication protocols, frequencies and further including a command channel, a Central Selection Agency (CSA), a home location register and a visitor location register accessible to the agency, a method for obtaining communication services for a user at a preferred protocol, bandwidth, and cost comprising the steps of:

registering user connection requirements in a profile different from default connection requirements in the Central Selection Agency;

determining the user location and connection parameter;

broadcasting user information including user ID, location, connection capabilities on a common command channel;

receiving the user information at a base station and transmitting the information to the Central Selection Agency;

selecting the network and base station for the connection and forwarding the selection to the associated base station for transmitting to the user device;

tuning the user device to the base station and initiating a connection with the appropriate protocol where by the user is connected to the network at a preferred protocol, bandwidth and cost;

detecting an impending handoff of a call in a first network to a second network;

notifying the CSA of the impending handoff;

checking the CSA database for call parameters of the second network;

sending an incoming traffic message to the second network from the CSA;

picking up the call by the second network;

mapping the user to a landline port by the network; and updating the CSA database and billing.

21. The method of claim 20 further comprising the steps of:

sending the second network call parameter to the user;

determining if the second network parameters are acceptable to the user;

transferring the user to the second network if the second network parameters are acceptable; and forwarding a landline connection of the user to the second network.

22. The method of claim 21 further comprising the steps of:

programming a user device to change call connections at random times from one network to a different network covering the user.

* * * * *